United States Patent Office 3,474,039
Patented Oct. 21, 1969

3,474,039
HARD, MACHINABLE, TRANSPARENT ORGANO-POLYSILOXANE FILTERS, THEIR MANUFACTURE AND USE
Charles W. Newing, Jr., Sylvania, Ohio, assignor to Owens-Illinois, Incorporated, a corporation of Ohio
No Drawing. Filed Aug. 23, 1965, Ser. No. 481,936
Int. Cl. G02b 5/20
U.S. Cl. 252—300    19 Claims

ABSTRACT OF THE DISCLOSURE

A band-pass filter for transmitting a preselected band of visible light in the wavelength above about 4000 A. units is prepared by incorporating a visible light absorbing compound such as ferric trithenoyltrifluoroacetonate in a transparent machinable solid organopolysiloxane prepared in a certain manner. The organopolysiloxane is prepared by heating the silane represented by the formula $TSiZ_3$ in which T is an alkyl group such as methyl or an alkenyl group such as vinyl or an aryl group such as phenyl and Z is an alkoxy group such as ethoxy, with water; concentrating the resultant reaction mixture by heating it at a temperature of about 100–300° C. to remove by-product alkanol and water; precuring the concentrated product by heating at a temperature of about 90° to 185° C. to provide a further curable organopolysiloxane. The visible light absorbing compound generally is mixed with the further curable organopolysiloxane which is then formed into an article adapted for use as a filter in said preselected wavelength of visible light.

---

This invention relates to organopolysiloxane compositions. The invention is also concerned with a process for the manuafcture of said organopolysiloxane compositions, filters which are formed from these compositions and a process for filtering visible light.

Organopolysiloxane compounds are generally known. However, the use of specific thermosetting organopolysiloxane compounds as host materials for a visible light absorbing compound is not taught by the prior artisans. Accordingly, the processes for the manufacture of doped organopolysiloxanes are also novel, as are the filters formed from said compositions and the process for filtering light with these filters.

Visible filters and filtering compositions are commonly utilized in chemical analytical procedures. A plurality of the prior art host materials are adapted for use in the visible range. Examples of these prior art host materials are glass, solvents such as water and plastics such as the acrylics. While most of these filtering systems are somewhat satisfactory, they have several inherent disadvantages.

Glass is solid material and possesses excellent transmission properties in the visible range. However, glass as an inorganic material, has a very high melting point which effectively precludes its use as a host material for organic dopants. That is, when an organic dopant is introduced into molten glass, the temperature of the glass is substantially above the decomposition temperature of the organic dopant with the result that the dopant immediately decomposes. Glass is also a very hard and brittle material. Accordingly, it is extremely difficult to form filters from glass and once they are formed, they are very susceptible to breakage.

The solutions of various compounds, possess a limited degree of utility as visible light absorbing media. However, because these compositions are liquid, they must be contained in some way. The possibility of leakage through breakage is prevalent and odd shaped filters can not be formed. These solutions are also disadvantageous in that small changes in the preparatory technique often results in marked changes in the visible light absorbing characteristics of the solution. Therefore reproduction of desired results is often difficult or impossible. Likewise, solutions can not be used in a vacuum, whereas the product of this invention can. While there are other plastics on the market which exhibit visible light transmission, these plastics can not be used for forming a visible filter as they degrade in the presence of the ultraviolet radiation which is usually incident to visible light. As a result of this degradation, the plastic host material tends to darken with the result that its visible light transmission properties are drastically altered. Plastic type materials likewise usually possess poor heat resistance and as such are not suitable as filter materials at elevated temperatures. In contrast, the organopolysiloxane compounds as used in this invention do not degrade in the presence of ultraviolet radiation and are stable up to 170° C. Accordingly, the visible transmission qualities of filters formed from organopolysiloxane compounds do not vary when exposed to ultraviolet radiation or elevated temperatures.

In comparison with the above described compositions of the prior art, the subject organopolysiloxane host materials can be formed at a temperature which is between the range of from about 50° C. to about 230° C. With this low forming point, metallic chelate dopants can be added without the decomposition of the dopant. Likewise, the processing of the organopolysiloxane compositions of this invention, is made easier by the fact that they are soluble in a wide range of solvents. A wide range of transition metal chelate dopants are soluble in or have a common solvent with the compositions of this invention. The compositions of this invention are clear solids which can be readily molded or machined into many desired shapes. Because of these forming characteristics, any shape or size filter can be formed including odd shaped special application filters. The organopolysiloxane host materials of this invention are also particularly advantageous in that they possess excellent transmission qualities from 1900 A. to 4000 A., they possess excellent heat stability properties, and as plastic type materials are not as susceptible to breakage as glass.

Accordingly, the objects of this invention are to produce to a composition which has filtering properties in the visible range and to produce a filter from said composition. More specifically, the object of this invention is to produce an organopolysiloxane composition which is doped with a transition metal chelate and the formation of a filter therefrom.

ORGANOPOLYSILOXANE HOST MATERIALS

Organopolysiloxane compounds which are adapted for use in the subject invention are produced by the hydrolysis and condensation of at least one compound embraced by Formula I.

(I) $\quad T_nSiZ_{(4-n)}$ wherein
T independently generally represents a member such as alkyl, alkenyl and aryl. More specifically T is independently a member such as alkyl, e.g., methyl, ethyl and propyl through hexyl (both normal and isomeric forms), cyclopentyl, cyclohexyl, vinyl and the normal and isomeric forms of propenyl through hexenyl and phenyl;

Z independently generally represents a hydrolyzable group. More specifically Z is independently a member such as halogen (chloride, bromine, fluorine and iodine), alkoxy (e.g., methoxy through heptoxy), and acyloxy (e.g., acetoxy, propionoxy, butyroxy, pentanoxy, hexanoxy, etc.) and aryloxy, e.g., phenoxy;

n represents a positive integer of less than 2 but is preferably 1.

In Formula I, as given above for substituent Z alkoxy groups are preferred because their hydrolysis products are less acidic, and therefore control of the rate of siloxane condensation is simpler. Alkoxy groups of less than 5 carbon atoms are especially advantageous (and are preferred), because the rate of hydrolysis can be inconveniently slow when the organic hydrolyazle radical(s) have a higher molecular wieght (i.e., more carbon atoms).

It will be understood, of course, by those skilled in the art that some or all of the Z's in Formula I can also represent an —OH group. Hence, the term "hydrolyzable" as used herein and in the appended claims is intended to include within its meaning compounds wherein the hydrolyzable group or groups have already been hydrolyzed to an —OH group or groups, unless it is clear from the context that the more limited meaning is intended. The terms "hydrolysis" product and "condensation" product as used in the preceding paragraph and elsewhere in this specification, and in the appended claims, are intended to include within their meaning the cohydrolysis and cocondensation products that result when mixtures of silicon-containing starting reactants are employed.

Preferred organosilane monomers adapted for use in this invention consist essentially of a compound represented by Formula II.

(II) 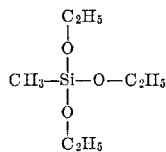

or a mixture of compounds as represented by Formulae III and IV.

(III) 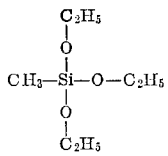  (IV) 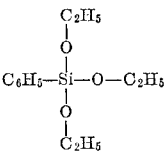

During the in situ hydrolysis and polymerization compounds III and IV link together to form a copolymer. The molar ratio of the compound as represented by Formula III to the compound as represented by Formula IV can be from 1:10 to 10:1 with a more preferred ratio being 1:5 to 5:1. A most preferred composition is produced by the hydrolysis and condensation of 2 moles of the compound as represented by Formula III with one mole of the compound as represented by Formula IV. Up to 10 mole percent but preferably up to 5 mole percent of diphenylsilanediol can be incorporated into the copolymer that is produced by the condensation of compounds as are represented by Formulae III and IV by cocondensation.

In the subject invention at least one monomeric organosiloxane compound as is represented by Formulae I, II, III and IV is converted into solid organopolysiloxane compounds by the following general procedure. The organosiloxane compound or compounds are hydrolyzed at a temperature of from about 50 to about 80° C. for a period of time of from about 1 to about 10 hours, in the presence of water. The temperature is then raised to from about 100 to about 300° C. for a period of time of from about 1 to about 30 minutes to effect the removal of the by-product alcohol and excess water. This also effects the further condensation of the product to produce a heat-curable organopolysiloxane. The heat-curable organopolysiloxane is then partially cured at a temperature of from about 90 to about 185° C. for a period of time of from about ½ to about 24 hours. This partially cured product is then finally cured at a temperature of from about 90 to about 200° C. for a period of time of from about 4 to about 168 hours.

During condensation the above discussed organosiloxane compounds cross-link to form compounds that exhibit exceptional physical properties such as stability and hardness.

The composition and preparation of the monomeric organosiloxane compounds and their subsequent polymerization and copolymerization is fully discussed in copending U.S. patent application Ser. No. 306,344, filed Sept. 3, 1963 (now abandoned), and U.S. patent application Ser. No. 370,684, filed May 27, 1964 (now abandoned), these applications being assigned to the corporate predecessor or the same assignee as the assignee of this invention.

The formulation, polymerization and application of the monomeric organosiloxane compounds and organopolysiloxane compounds of this invention is carried out in the presence of a solvent such as methanol, ethanol, butanol, acetone, ethyl acetate, benzene, xylene, toluene, ethylene glycol monomethyl ether, ethylene glycol monomethyl ether acetate, ethylene glycol ethyl ether, ethylene glycol ethyl ether acetate, ethylene glycol ethyl butyl ether, ethylene glycol butyl ether acetate, ethylene glycol dibutyl ether, ethylene glycol monohexyl ether, ethylene glycol monophenyl ether, etc.

THE CHELATE VISIBLE LIGHT ABSORBING DOPANTS

As visible light absorbing compounds, the subject invention is adapted to utilize transition metal chelates. These metal chelates are particularly advantageous because the chelate portion of the dopant molecule tends to stabilize the metal portion of the dopant molecule against oxidation or reduction with the result that an extremely stable filter is produced. The chelates which are used in the present invention are compounds composed of a chelating (chelate-forming) structure which contains at least two donor groups so located with respect to one another that they are capable of forming a chelate ring (normally of five or six members) with a transition metal. The donor groups are well known and recognized by those skilled in the art of chelate chemistry. See, for example the following literature references concerning chelate chemistry and lists of principal donor groups: "The Chelate Rings," by H. Diehl, "Chemical Reviews" 21, 39–111 (1937); and "Chemistry of the Metal Chelate Compounds," by Martell and Calvin, published in 1952 by Prentice-Hall, Inc., New York, N.Y. (1952). It might here also be mentioned that in chelate-chemistry language, organic compounds containing the aforementioned chelating structure are often designated as "ligands"; and organic compounds having at least two ligand functions (i.e., at least two chelating structures) are often termed "polyligands." The aforementioned donor groups, and hence the chelate-forming structures or ligands therefrom, contain many different donor atoms among which may be mentioned by way of example oxygen, sulfur and nitrogen atoms.

The transition metal chelates used in carrying the instant invention into effect are preferably, but not necessarily, a chelate of a transition metal and a "volatile chelating agent"; and by which latter term is meant more patricularly an organic compound that can be vaporized (volatilized) with little or no decomposition. For example, such volatile chelating agents advantageously are those boiling below about 300° C. at 760 mm. pressure, although the use of chelating agents boiling above this temperature is not precluded.

A preferred chelating agent is a ketone embraced by Formula V, (V) 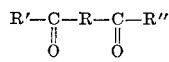

wherein

R represents a divalent aliphtaic hydrocarbon radical having from 1 to 3 carbon atoms, inclusive;
R′ repersents a monovalent radical selected from the group consisting of monovalent hydrocarbon, halohydrocarbon, oxyhydrocarbon and thiohydrocarbon radicals having from 1 to 12 carbon atoms, inclusive; R" has the same meaning as R' and, in addition, hydrogen atom.

The oxyhydrocarbon and thiohydrocarbon radicals (both monovalent and divalent) referred to in the above definitions of R' and R" in Formula V are radicals wherein the carbon atoms of a hydrocarbon chain are interrupted by one or more ether (—O—) atoms or by one or more thioether (—S—) atoms.

Illustrative examples of divalent radicals having from 1 to 3 carbon atoms, inclusive, that are represented by R in Formula V are divalent aliphatic hydrocarbon radicals, having from 1 through 3 carbon atoms, e.g., alkylenes such as methylene, ethylene, propylene and isopropylene; and alkenylenes such as ethenylene, propenylene and isopropenylene.

Illustrative examples of radicals represented by R' and R" in Formula V are the monovalent hydrocarbon, halo hydrocarbon, oxyhydrocarbon and thiohydrocarbon radicals containing from 1 to 12 carbon atoms, inclusive. More specific examples of such radicals are aliphatic (including cycloaliphatic), aromatic-substituted aliphatic, aromatic, and aliphatic-substituted aromatic hydrocarbon radicals having from 1 through 12 carbon atoms such as alkyl, e.g., methyl, ethyl and propyl through dodecyl (both normal and isomeric forms), cyclopentyl, cyclohexyl, cycloheptyl, etc.; alkenyl, e.g., vinyl, ethenyl, propenyl and other alkenyl radicals corresponding to the aforementioned alkyl radicals; aralkyl, e.g., benzyl, phenylethyl, phenylpropyl, etc.; aryl, e.g., phenyl, biphenylyl, naphthyl, etc.; alkaryl, e.g., tolyl, xylyl, diethylphenyl, dipropylphenyl, butylphenyl, etc.; the corresponding chlorinated, brominated and fluorinated derivatives (mono- through perhalogenated) in the linear chain and/or in the aromatic nucleus; and the corresponding oxy and thio derivatives wherein one or more oxygen and/or sulphur atoms are positioned between carbon atoms in a linear chain and/or an aromatic ring. For instance R' and/or R" in Formula V may be alkoxyalkyl (e.g., methoxymethyl-, -ethyl, -propyl, -butyl, -pentyl and hexyl) or the corresponding thio derivatives; the methoxy- through pentoxyphenyls or the corresponding thio derivatives; or heterocyclic compounds containing one or more oxygen or sulfur atoms in the ring, e.g., thienyl, furyl and the like.

When the chelating agent employed is a ketone embraced by Formula V in certain cases one may use advantageously ketones boiling below about 300° C. at 760 mm. pressure.

The chelating agents employed in the preparation of the metal acylacetonates and other metal chelates are those which are most readily available at minimum cost. Examples of classes of such chelating agents are the 1,3-diketones of which the diketones embraced by Formula V are a preferred subclass, the β-ketoesters and the aromatic o-hydroxyaldehydes and esters. More specific examples of such chelating agents including those embraced by Formula V as well as of others outside the scope of this formula are acetylacetone, propionylacetone, butyrylacetone, valerylacetone, caproylacetone, caprylylacetone, benzoylacetone (1-phenyl-1,3-butanedione), 3-methyl-2,4-pentanedione, 3-ethyl-2,4-pentanedione, trifluoroacetylacetone, 2-thenoylacetone, 2-thenoyltrifluoroacetone, 2-furoylacetone, 2-furoyltrifluoroacetone, ethyl through heptyl acetoacetates, salicylaldehyde, metal salicylate, ethyl salicylate, and others that will be apparent to those skilled in the art from the foregoing illustrative examples.

Other preferred chelating agents adapted for use in this invention are substituted and unsubstituted 8-hydroxyquinolines and phthalocyanines.

Preferred transition metal chelate compounds adapted for use in this invention are: ferric thenoyltrifluoroacetonate, cupric thenoyltrifluoroacetonate, vanadyl diacetylacetonate, cobaltous thenoyltrifluoroacetonate and nickelous thenoyltrifluoroacetonate.

PREPARATION OF THE CHELATES DOPANTS

Various methods for the preparation of most of the transition metal chelates are described in the prior art.

The technique used by the applicant in preparing chelates dopants as used in this invention is exemplified in the examples. Generally, stoichiometrical amounts of a solution of a water-soluble salt of a transition metal, e.g., the chloride or nitrate salt, are brought into reactive relationship with a solution of a chelating agent, such as a 1,3-diketone, in the presence of an equivalent amount of a base. Surprisingly, the applicant found that in such a reaction quinoline and less so pyridine are markedly superior to other bases heretofore employed in making the metal chelates that are used in modifying organopolysiloxanes in accordance with this invention. In addition to the solvents employed in the specific examples, one may use other solvents such as those set forth in the prior art, e.g., in the aforementioned literature citations. In preparing the chelate, one usually may advantageously employ a solvent solution of the chelating agent in an amount which is up to, for example 10 percent in excess of stoichiometrical proportions.

INCORPORATION OF A LIGHT ABSORBING DOPANT CHELATE INTO AN ORGANOPOLYSILOXANE

Any suitable technique may be used in incorporating the transition metal chelates into the organopolysiloxane. In some instances it may be advantageous to admix the chelate with the silanol(s) and/or precursor(s) of silanol(s) prior to hydrolysis (if a precursor or precursors are employed) and condensation to an organopolysiloxane.

The chelates may be admixed with liquid, semisolid or solid organopolysiloxanes at any stage of their preparation or after the organopolysiloxane has been formed, the exact point of admixture depending upon such influencing factors, as, for example the ultimate physical state or form of the organopolysiloxane and the use to which the chelate-modified organopolysiloxane is to be placed. For instance, if the organopolysiloxane is normally a liquid, the chelate may be incorporated into the crude (i.e., impure) organopolysiloxane if the latter is to be modified and employed without further purification prior to use; or the chelate may be admixed with the purified organopolysiloxane fraction of the desired B.P. or boiling range. In the case of the semisolid organopolysiloxanes such as those in the form of greases, the chelate may be admixed with the organopolysiloxane during or after its conversion to a semisolid (e.g., grease or grease-like consistency). If the ultimate organopolysiloxane is normally a solid obtained by curing (e.g., heat-curing) a curable (e.g., heat-curable) organopoysiloxane and the end-product is to be used in comminuted or finely divided state (e.g., a fineness of from 100–300 mesh or more, U.S. Standard Sieve Series), then the chelate may be mixed in a suitable blender with the finely divided organopolysiloxane until a homogeneous (substantially homogeneous) mixture is obtained.

The preferred method of incorporating the transition metal chelate into an organopolysiloxane, more particularly a curable (e.g., heat-curable) organopolysiloxane, comprises partly curing a curable organopolyisiloxane; forming a homogeneous admixture of (a) the partly cured organopolysiloxane in liquid state and (b) a solvent solution of a transition metal chelate (numerous examples of which have been given hereinbefore); and completing the cure of the partly cured organopolysiloxane in the presence of the said chelate. The preferred organopolysiloxane comprises or consists essentially of the siloxane condensation product hydrolyzable silane including at least one compound represented by Formula I. The reference above to the "liquid state" of such organopolysiloxanes means that they may be liquid in the absence of a solvent or that they may be dissolved or dispersed in a solvent to form a liquid composition.

The preferred modifier of the organopolysiloxane is a transition metal chelate of a ketone represented by Formula V.

A more preferred specific embodiment of the method features of the present invention is directed to a method of producing a visible light absorbing composition which comprises:

(A) Hydrolyzing a hydrolyzable silane including at least one compound represented by the general formula $$T_nSiZ_{(4-n)}$$

wherein each T independently represents a member of the group consisting of alkyl, alkenyl and aryl radicals having less than 7 carbon atoms, each Z independently represents a hydrolyzable group, and $n$ represents a positive integer less than 4, but is preferably 1;

(B) Condensing the hydrolysis product to yield a heat-curable organopolysiloxane;

(C) Adding to the heat-curable organopolysiloxane in liquid state a solvent solution of a transition metal chelate of a ketone embraced by Formula V, the said transition metal chelate being present in an amount sufficient to impart visible light absorbing properties to the cured organopolysiloxane composition;

(D) Mixing the resulting liquid mass to form a homogeneous mixture;

(E) Partly curing the heat-curable organopolysiloxane at a temperature of from about 90 to about 135° C. for from about ½ to about 36 hours; and (F) Completing the cure of the partly cured organopolysiloxane in the presence of the transition metal chelate at a temperature of from about 90 to about 135° C. for a period of time of from about ½ to about 36 hours.

In accordance with the subject invention, from about .00001 to about 15 weight percent as based on the final product of a transition metal chelate having visible light absorbing characteristics can be incorporated into the organopolysiloxane host material. A more preferred range for the addition is from about .0001 to about 2 percent.

It is to be noted that the host material of the subject invention can be doped so as to effectively block the transmission of visible light so as to emphasize a narrow band of radiation, or conversely dopants can be chosen which will block the transmission of a specific band and allow transmission in other regions. Likewise, by the proper choice of doping agents, the composition of this invention can be doped to match the visible spectrum of any desired compound and thereby produce a filter which can be utilized as a standard for said compound.

Filters formed according to this invention can be produced by molding the doped organopolysiloxane material into the desired shape. Filter blanks can also be formed, these blanks being subsequently machined and polished into the desired shape.

The following examples will illustrate the subject invention. These examples are given for the purposes of illustration and not for the purpose of limiting this invention.

Example I

A filter was prepared according to the following. To 150 ml. of a 50 percent ethanol solution of hydrolyzed methyltriethoxysilane was added 0.1 gram of ferric trithenoyltrifluoroacetonate which was dissolved in 10 ml. of ethanol. The resulting mixture was heated with stirring to 140° C. and poured into molds ⅛ inch thick. The molds were then put into an oven which was at 90° C. for 96 hours. At the end of that time hard transparent filters which were colored an orange red were removed from the molds. Spectrographic analysis showed 50 percent adsorption at 570 m$\mu$ and complete adsorption of all light below 420 m$\mu$.

Example II

An organopolysiloxane was prepared by the hydrolysis and condensation of two moles of methyltriethoxysilane with one mole of penyltriethoxysilane in the pressure of water. 150 ml. of a 50 percent ethanol solution of this organopolysiloxane was then heated to 140° C. A second solution that was prepared by dissolving 0.1 gram of cupric thenoyltrifluoroacetonate in ethanol, and added to the organopolysiloxane with stirring until a homogeneous mass was produced. This material was poured into molds ⅛ inch thick and put into a 90° oven for 96 hours.

The resulting hard transparent resin was colored a deep green. Spectrographic analysis showed adsorption at 462 m$\mu$ and complete adsorption of all light below 410 m$\mu$.

Example III

As per the description given in Example II, a filter was prepared which incorporated cobaltous thenoyltrifluoroacetonate. Spectrographic analysis showed 50 percent adsorption at 470 m$\mu$ and complete adsorption of all light below 420 m$\mu$.

Example IV

Utilizing the procedure of Example II, nickelous thenoyltrifluoroacetonate was incorporated into the organopolysiloxane mixture. Spectrographic analysis showed 50 percent adsorption at 428 m$\mu$ and complete adsorption of all light below 380 m$\mu$.

What is claimed is:

1. A method of making a filter for transmitting a preselected band of visible light and absorbing wavelengths on either side of the band, the process comprising the steps of:
   (1) heating a silane of the formula $TSiZ_3$ in which T is a member of the group consisting of alkyl, alkenyl, and aryl having from 1 to 6 carbon atoms, and Z is an alkoxy group containing from 1 to 6 carbon atoms in the presence of water;
   (2) concentrating the reaction mixture of Step 1 by heating it at a temperature of about 100 to 300° C. to remove by-product alkanol and water;
   (3) precuring the product of Step 2 by heating at a temperature of about 90° to 185° C. to provide a further curable organopolysiloxane;
   (4) mixing with the further curable organopolysiloxane an effective visible light absorbing amount of a transition metal chelate; and
   (5) forming the resultant mixture into an article adapted for use as a filter in said preselected band of wavelength.

2. A method as defined in claim 1 in which the silane is methyltriethoxysilane.

3. A method as defined in claim 1 in which the silane is a mixture of methyltriethoxysilane and phenyltriethoxysilane.

4. A method as defined in claim 1 in which the silane is methyltriethoxysilane and the transition metal is a metal of the group consisting of iron, cobalt, nickel, and vanadium.

5. A hard, machinable, transparent organopolysiloxane filter having incorporated therein an effective visible light absorbing amount of a transition metal chelate that transmits a preselected band of visible light, the organopolysiloxane being prepared by:
   (1) heating a silane of the formula $TSiZ_3$ in which T is a member of the group consisting of alkyl, alkenyl and aryl having from 1 to 6 carbon atoms, and Z is an alkoxy group containing from 1 to 6 carbon atoms, in the presence of water;
   (2) concentrating the reaction mixture of Step 1 by heating the same at a temperature of about 100° to 300° C. to remove by-product alkanol and water;
   (3) precuring the product of Step 2 by heating at a temperature of about 90° to 185° C. to provide a further curable, organopolysiloxane; and (4) forming the resultant organopolysiloxane into an article adapted for use as a filter in a preselected band of wavelength.

6. A filter as defined in claim 5 in which the transition metal chelate is a ferric chelate.

7. A filter as defined in claim 5 in which the transition metal chelate is a cupric chelate.

8. A filter as defined in claim 5 in which the transition metal chelate is a cobaltous chelate.

9. A filter as defined in claim 5 in which the transition metal chelate is a nickelous chelate.

10. A filter as defined in claim 5 in which the transition metal chelate is the reaction product of a transition metal and a volatile organic chelating agent that has a boiling point below about 300° C. at 760 mm. of mercury.

11. A filter as defined in claim 5 in which the transition metal chelate is a reaction product of a transition metal and a chelating ketone having the formula

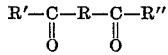

wherein R is a divalent aliphatic hydrocarbon radical having 1 to 3 carbon atoms, R' is a monovalent radical having 1 to 12 carbon atoms and a member of the group consisting of hydrocarbon, halohydrocarbon, oxyhydrocarbon, and thiohydrocarbon, and R" is a member of the group consisting of hydrogen and R' radicals.

12. A filter as defined in claim 5 in which the transition metal chelate is ferric trithenoyltrifluoroacetonate.

13. A filter as defined in claim 5 in which the transition metal chelate is cupric thenoyltrifluoroacetonate.

14. A filter as defined in claim 5 in which the transition metal chelate is cobaltous thenoyltrifluoroacetonate.

15. A filter as defined in claim 5 in which the transition metal chelate is nickelous thenoyltrifluoroacetonate.

16. A filter as defined in claim 5 in which the amount of transition metal chelate is about 0.001 to about 2% by weight of the organopolysiloxane.

17. A filter as defined in claim 5 in which the silane is a mixture of about 2 moles of methyltriethoxysilane and 1 mole of phenyltriethoxysilane.

18. A process for selectively controlling the transmission of a beam of visible light which comprises passing a beam of visible light through the filter of claim 5.

19. A process for selectively controlling the transmission of a beam of visible light which comprises passing a beam of visible light through the filter of claim 12.

References Cited

UNITED STATES PATENTS

| 2,465,296 | 3/1949 | Swiss | 260—45.75 X |
| 2,989,559 | 6/1961 | Marsden | 252—300 X |
| 3,008,858 | 11/1961 | Blake et al. | 252—300 X |

RICHARD D. LOVERING, Primary Examiner

U.S. Cl. X.R.

117—33.3; 260—45.75